June 24, 1930. H. LINDNER 1,768,089
THREAD CUTTER
Filed April 8, 1924
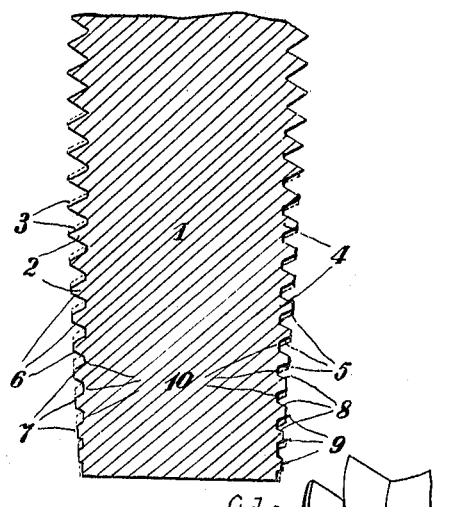
Fig.1.
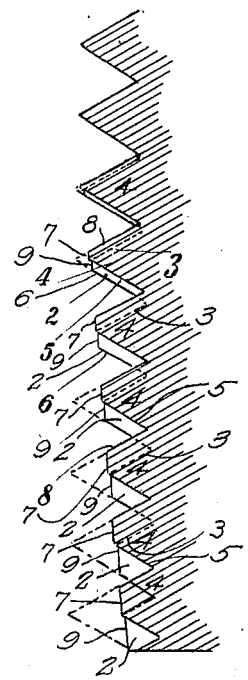
Fig.2.
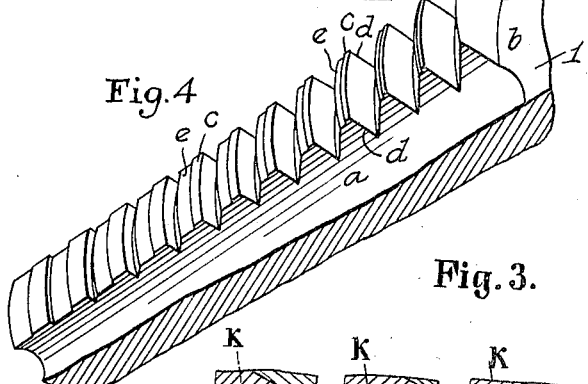
Fig.4.
Fig.3.
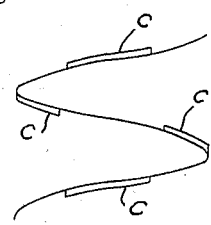
Fig.6
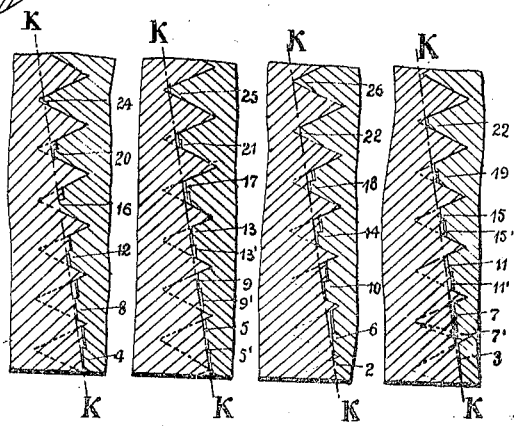
Fig.5
Inventor:
Herbert Lindner
By: Herbert G. R.
Attorney Patented June 24, 1930

1,768,089

UNITED STATES PATENT OFFICE

HERBERT LINDNER, OF BERLIN, GERMANY

THREAD CUTTER

Application filed April 8, 1924, Serial No. 705,060, and in Germany April 25, 1923.

This invention relates to improvements in screw thread cutting taps of that class in which the body of the tap is tapered toward its free end and is provided with a plurality of longitudinal grooves between which grooves are the racks of segmental cutting teeth.

The object of the invention is to effect improvements in the construction of the teeth so as to greatly improve the capacity and thread cutting efficiency of the tap by substantially equalizing the cutting work of the teeth and reducing the cutting work of each tooth so that the teeth succeed one another and each cuts only a portion of the thread.

A specific object of the invention is to provide each tooth, the flanks or sides of which located at the grooves of the body present and form the cutting edges proper, with projections which are of less width than the peripheral portion of the tooth and which projections of the series of teeth following each other around the tap are arranged in staggered relation so that their cutting edges or flanks are located on different portions of the rows of teeth distributed spirally around the tap body.

With the above and other objects in view, the invention consists in the construction and arrangement of parts hereinafter described and claimed.

In the accompanying drawings

Figure 1 is a diagrammatic axial section through about one half of a tap constructed in accordance with this invention.

Figure 2 is a diagrammatic section on a larger scale through the rack of teeth on the left hand side of the tap, Figure 1, with additional lines to facilitate the disclosure of the invention.

Figure 3 constitutes a series, in four parts, of sections illustrating a modification of the invention.

Figure 4 is a detail sectional perspective showing one of the toothed racks of the tap on an enlarged scale.

Figure 5 is a transverse sectional view of the tap.

Figure 6 is a diagram showing the mode of operation of the tap.

The tap 1 is provided in the usual manner with grooves $a$ between which are the racks or rows of teeth. In Figure 1 two rows 2 and 4 are shown. The teeth of several racks are formed in helical arrangement. The circumferential surfaces of the teeth are narrowed so that the width of the circumferential cutting edge, normally produced by the conical form of the first cut, portion is distributed in the operation of the tap on several successive teeth of the successive racks. In other words, the circumferential surfaces $c$ located between the flanks $d$ are reduced in length, axially of the tap. That is to say, the peripheral portion of each tooth is provided with a reduced tapered or rebated peripheral portion $e$ which is beside the peripheral portion $c$. This reduction changes around the tap in such manner that the one tooth of one rack is reduced at its upper flank, the following tooth of the next successive rack is reduced at its lower flank, the tooth of the next successive rack at its upper flank and so on from tooth to tooth spirally around the body of the tap from the tapered end to where the reduction of the length of the cutting edges finally ceases.

The reduction of the axial length of the cutting edges is not uniform along the tap, but decreases from the tapered end to the other end thereof and ceases at a point somewhat remote from the other end where it becomes zero. This appears distinctly from Figure 1, in which are shown two rows of teeth, to wit, a left hand row 2, the teeth of which have upper flanks 3 and lower flanks 6, and a right hand row or rack 4 the teeth of which have lower flanks 5 and upper flanks 8. In the teeth 2 the upper flanks 3 are cut away for a certain portion and in the teeth 4 the lower flanks 5 are those which are reduced in axial length. The said figure shows distinctly that the length of the cut off portions of the cutting edges become shorter and shorter upwardly or toward the inner end of the tap, until the zero point is reached, and that reduction takes place only from the tapered portion of the tap.

In apportioning the normal breadth of the circumferential cutting edge to three or more successive teeth, the breadth of tooth resulting from the displacement of the upper or lower or of both to the flanks 3 and 5, would, however, be only one-third of the normal breadth. It is immaterial whether by the displacement of the flanks 3 and 5 that there be formed on the shaft of the tap a cylindrical surface 10, as such surface does not come in contact with the work piece to be provided with a thread in the operation of the tap.

The modification shown in Figure 2 is a diagrammatic section of one rack of teeth, the plane of which section is in the teeth 4 and the consecutive teeth 2 which are located in staggered relation to the teeth 4 appear in perspective. The thread to be cut by the teeth is indicated in dotted lines. 8 denotes the upper sides of the teeth 4 and 5 denotes the lower sides or flanks of such teeth. 3 denotes the upper flanks of the teeth 2 and 6 denotes the lower flanks thereof. 7 indicates the cutting edges of the teeth 4 and 9 indicates the cutting edges of the teeth 2. The alternation as it appears in Figure 2 is continued around a tap in spirals. Each cutting edge is reduced in length, that is to say, axially of the tap, as in the form shown in Figure 1. An important feature of construction is that the reductions of the cutting edges alternate from tooth to tooth along the entire length of the helical line formed by the consecutive teeth and the axial length of the remaining portions of said teeth diminishes from the tapered end to the body of the tap as shown.

In case the breadth of the peripheral cutting surface is one half that of the periphery, as is shown in the example 5'—15', Figure 3, then at every second tooth the lower part of its cutting edge is set back at the circumference, so that each such tooth is made shallower by the set back portion of its periphery.

The teeth following each other in first cutting, that is to say on the tapered portion of the tap, are designated 2—25 and the peripheral cutting edges may in such teeth be either on the line $k$—$k$ or more or less behind or within such line to provide for all the teeth and approximately equal cutting sectional area. The shape of the usual first cut is paraboloid.

It is preferable that the curve produced by the greater or less recession of the cutting edges behind the line $k$—$k$ will, toward the end of the first cutting portion of the tap, run out rather abruptly into the cylinder formed by the main portion thereof.

By such construction the stress on the teeth, especially when cutting angular and trapezoidal thread, will be distributed substantially uniformly to all the teeth, because the entire width of every step of cutting is apportioned to several successive cutting portions $c$ of the teeth and every tooth doing cutting work is cutting at the same width as the preceding tooth and also deeper than the preceding tooth, as such cutting edges come into action successively because of their arrangement in staggered relation to one another, as well as to the bearing teeth.

It will be understood that in accordance with this invention stocks and so-called screw dies for stocks and dies for thread cutting machines may be also constructed and that a thread cutting device thus formed may be operated at higher speed and with greater facility than heretofore.

Having thus described my invention, I claim:

1. A screw tap, comprising a body tapered in the direction to its free end and having a plurality of longitudinal grooves, ledge-like racks located between said grooves and constituting the remainder of the body, teeth on said racks having peripheral projections, the flanks of said teeth being located at the said grooves and presenting the cutting edges proper, said peripheral projections of the teeth of the respective racks following each other around the tap in staggered arrangement so that their cutting flanks are located on different portions of the racks of teeth distributed around the tap body.

2. A screw tap, comprising a body tapered in the direction to its free end and having a plurality of longitudinal grooves, ledge-like racks located between said grooves and constituting the remainder of the body, teeth on said racks having peripheral projections, the flanks of said teeth being located at the said grooves and presenting the cutting edges proper, said peripheral projections of the teeth of the respective racks following each other around the tap in staggered arrangement, so that their cutting flanks are located on different portions of the racks of teeth distributed around the tap body, the radial height of the tooth portion located laterally from the appertaining projection of every tooth being such that said tooth portion is adapted to pass without friction through the cut made by the preceding projection.

In testimony whereof I affix my signature.

HERBERT LINDNER.